UNITED STATES PATENT OFFICE.

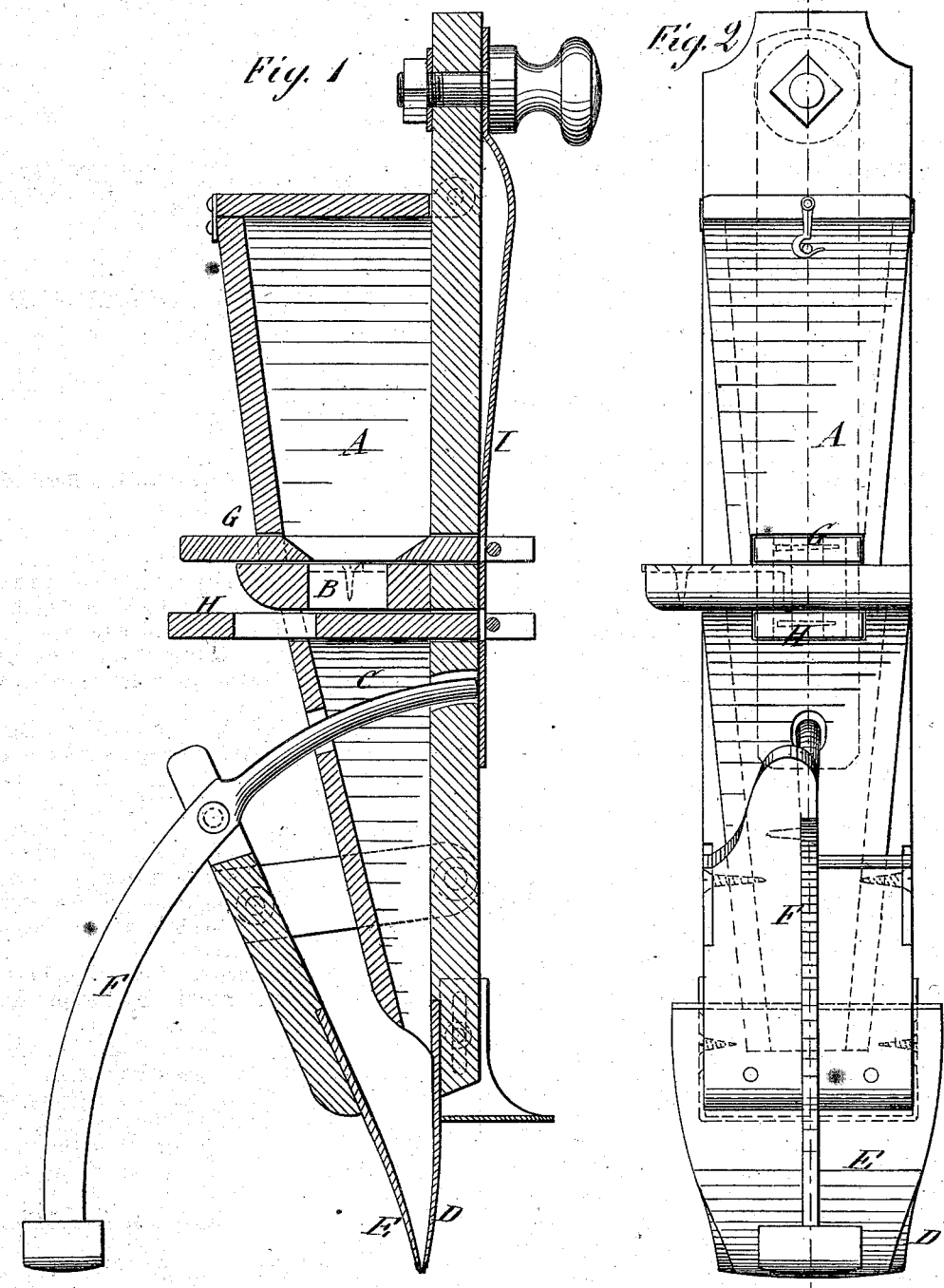

ABRAM STALEY, OF MARTIN, MICHIGAN, ASSIGNOR TO HIMSELF AND JOSEPH L. STALEY, OF SAME PLACE.

IMPROVEMENT IN CORN-PLANTERS.

Specification forming part of Letters Patent No. 159,618, dated February 9, 1875; application filed December 12, 1874.

*To all whom it may concern:*

Be it known that I, ABRAM STALEY, of Martin, Allegan county, Michigan, have invented a new and Improved Corn-Planter, of which the following is a specification:

The invention will first be fully described, and then pointed out in the claim.

Figure 1 is a sectional elevation of my improved corn-planter, and Fig. 2 is a front elevation.

Similar letters of reference indicate corresponding parts.

A is the grain-holder, at the bottom of which is the measuring-pocket B, from which the grain descends, through the conductor C, to the ground, in which an opening is made to receive it by the blades D E, which are first thrust into the ground, and then opened by swinging the planter forward on the leg F. At the bottom of the holder is the cut-off slide G, and below the pocket is the dropping-slide H, both connected to the spring I to be worked by it, and the spring bears against the upper end of leg F to be worked, so as to close the cut-off slide, and open the dropping-slide by it when the stock is swung forward on the leg.

When the planter is lifted out of the ground the spring pushes the slides back, opening the upper one and closing the other, and, at the same time, closing the blades.

The slides are so arranged relatively to each other that the opening through one registers with the passage through the pocket when the other does not, thus enabling one to close and the other to open by one and the same movement of the two slides.

The contrivance of these jaws and slides is such that the jaws open and make a good opening in the ground before the seed drops, which allows the seed to scatter as when planted by hand, and they open so that the seed can be seen after dropping, and before the jaws are lifted out of the ground, so as to be certain of the perfect action in every case. The machine also opens the ground, so as to insure the covering of the soil perfectly.

Having thus described my invention, I claim as new and desire to secure by Letters Patent—

The combination of the spring I, slides G H, and leg F with the seed-holder A C, as shown and described, so that the spring and slides will all be simultaneously operated by the same leg, while the slides, together with the leg, will all be simultaneously retracted by the same spring.

ABRAM STALEY.

Witnesses:
 JAS. R. WYLIE,
 E. H. SHEPHERD.